A. BARBARIN.

Assignor by mesne assigments to W. H. LOW.

BALE-TIE.

No. 7,388. Reissued Nov. 7, 1876.

Witnesses.

E. J. Bennett.

G. T. Lindsley.

Inventor

Arthur Barbarin.

by William H. Low

Attorney.

UNITED STATES PATENT OFFICE.

ARTHUR BARBARIN, OF NEW ORLEANS, LOUISIANA, ASSIGNOR, BY MESNE ASSIGNMENTS, TO WILLIAM H. LOW, OF ALBANY, NEW YORK.

IMPROVEMENT IN BALE-TIES.

Specification forming part of Letters Patent No. 66,065, dated June 25, 1867; reissue No. 7,388, dated November 7, 1876; application filed October 11, 1876.

*To all whom it may concern:*

Be it known that I, ARTHUR BARBARIN, of New Orleans, in the parish of Orleans and State of Louisiana, have invented certain new and useful Improvements in Bale-Ties, of which the following is a full, clear, and exact description, reference being had to the accompanying drawing, making a part of this specification, in which the several figures represent perspective views of my invention.

My invention consists of a metallic connecting-link, constructed substantially as herein set forth, and of the bale-tie herein shown and described, made of wire or wire-rope, having loops formed thereon by bending back the end of the tie to the body thereof, and twisting the two parts together, as shown in the drawing, and in such manner that the loop will be thereby strengthened to sustain the strain to which it is subjected.

The object of my invention is to produce, as a new article of manufacture, a perfected bale-tie and fastening device, complete within themselves, and not requiring the formation of the loops during the operation of applying the ties to the bales.

As represented in the drawing, A represents the metallic connecting-link, made in any of the forms indicated by the different figures shown therein; B, the loops formed at the ends of the tie by bending the end of the wire or wire-rope of which the tie is made around until it meets the body of the tie, with which it is twisted so as to strengthen the loop. By this means the loops are made in such manner that they will sustain a great strain and resist any tendency to straighten out when the stress is applied to them, and they will also maintain their form before they are applied to their fastening device, and after their removal therefrom. By making them in this way I am enabled to manufacture these ties in a complete and perfect condition before applying them to the bales, and for this purpose I preferably make the ties of wire, for the reason that when made thereof the loops will maintain themselves in a more perfect form and condition for use than when formed of wire-rope.

In Figs. 1 and 3 of the drawing the connecting-link is shown as consisting of two plates arranged parallelly, and connected together by the two curved supports or studs *a*, around which are encircled the loops B of the tie, an opening, *b*, being left between the supports, through which the ends of the tie are inserted. The only difference in their construction consists in making the studs *a* of Fig. 1 of a nearly-cylindrical form, while in Fig. 3 they are grooved to receive the loops of the tie.

Figs. 2 and 4, respectively, show the same connecting-links shown in Figs. 1 and 3, when provided with an opening, *c*, made by cutting through one of the plates, so that the ready-made loops of the tie may be slipped into it and upon the studs *a*. At each side of the opening *c* a portion of the plate is left to form the overhanging projections *d*, for the purpose of preventing the loops from slipping from the studs.

Figure 1:
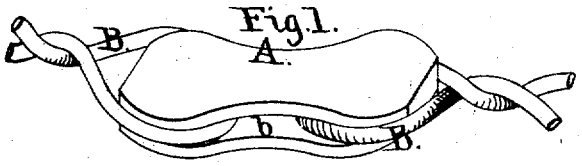
Figure 2:
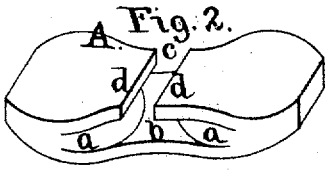
Figure 3:
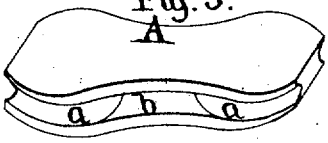
Figure 4:
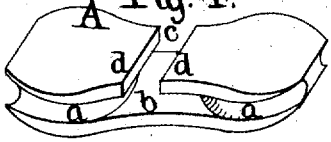
Figure 5:
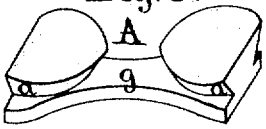
Fig. 5 represents a connecting-link made with tapering studs *a*, the smallest ends of the studs being attached to a single plate, *g*. By this means the loops are drawn down toward the plate, and are held there by being jammed into the angles formed by the junction of the studs with the plate.
Figure 6:
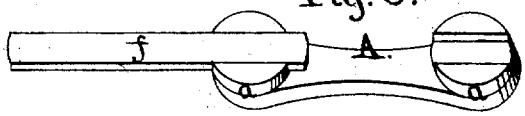
Fig. 6 shows a connecting-link having cylindrical studs *a*, provided with openings for the sliding bar *f*, which bar may be made of such length that when the loops B are fixed in position on the studs the ends of it may be bent over, so as to secure it from slipping out.

When the connecting-links shown in Figs. 1 and 3 are used the loops of the tie must be formed by passing the ends of the wire or rope through the opening *b* before the loop is made; but when made in any of the forms shown in the other figures the loops may be formed before the tie is attached to the bale, and it is clearly manifest that, when the loops are so formed, the ends of the tie may be secured together by any suitable means for fastening them.

I claim as my invention—

1. A wire bale-tie, having a loop at one or both ends, made by turning back the end of the wire to the body of the tie and twisting the two parts together for the purpose of giving greater strength to the loop, as herein specified.

2. The fastening device A, by means of which the two loops of a wire bale-tie are firmly connected together, substantially as and for the purpose herein specified.

3. The combination of a ready-made wire bale-tie, provided with loops formed by twisting the two parts of the wire together, as herein described, with a fastening device, by means of which the two loops are firmly connected, substantially as and for the purpose herein specified.

ARTHUR BARBARIN.

Witnesses:
F. J. BARTHELEMY,
C. H. STOCKER.